United States Patent [19]

Young et al.

[11] Patent Number: 4,919,310

[45] Date of Patent: Apr. 24, 1990

[54] PRESSURE GENERATION SYSTEM FOR A CONTAINER

[75] Inventors: David C. Young, Westminster; Mark A. Willcoxen, Lakewood, both of Colo.

[73] Assignee: Adolph Coors Company, Golden, Colo.

[21] Appl. No.: 318,824

[22] Filed: Mar. 2, 1989

[51] Int. Cl.$^5$ .............................................. B67D 5/54
[52] U.S. Cl. ...................................... 222/386.5; 222/1
[58] Field of Search .................... 222/1, 386.5; 424/43, 424/44, 45

[56] References Cited

U.S. PATENT DOCUMENTS

| | | | |
|---|---|---|---|
| 3,667,929 | 6/1972 | Flemming, Jr. | 424/44 X |
| 3,718,236 | 2/1973 | Reyner et al. | 222/386.5 |
| 4,646,946 | 3/1987 | Reyner | 222/386.5 |
| 4,785,972 | 11/1988 | LeFevre | 222/1 |

Primary Examiner—F. J. Bartuska
Assistant Examiner—Boris Milef
Attorney, Agent, or Firm—Klaas & Law

[57] ABSTRACT

A self-generating gas pressure apparatus such as an expandable closed pouch for placement within a container from which a flowable material therein is to be dispensed under pressure. The apparatus has a plurality of internal compartments formed by pressure-rupturable seals and containing two respective chemical compounds which, when mixed, produce a gas. One of the chemical compounds is in aqueous solution, while the other is a precipitate present in a water-dispersible suspension medium such as a gum, an algin, pectin, or mixtures thereof. The suspension provides for uniform dispersal of the precipitated chemical and a resultant effective reaction rate with the aqueous chemical reactant.

51 Claims, 4 Drawing Sheets

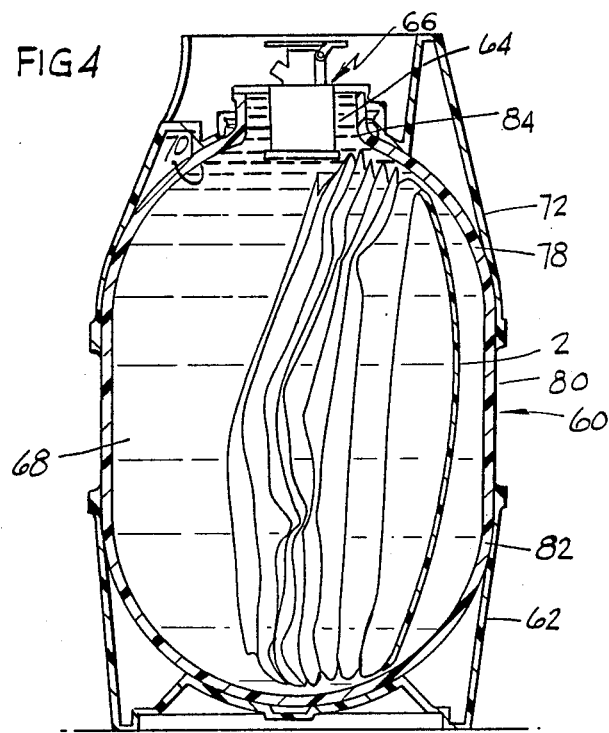
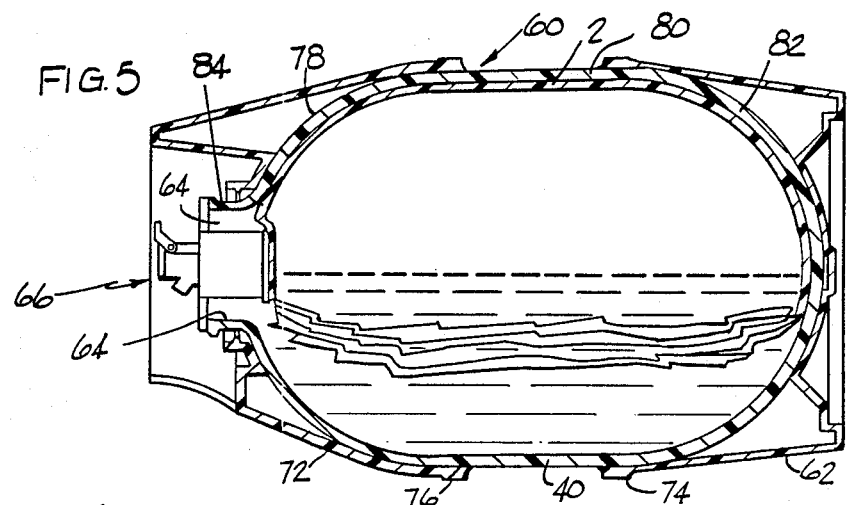
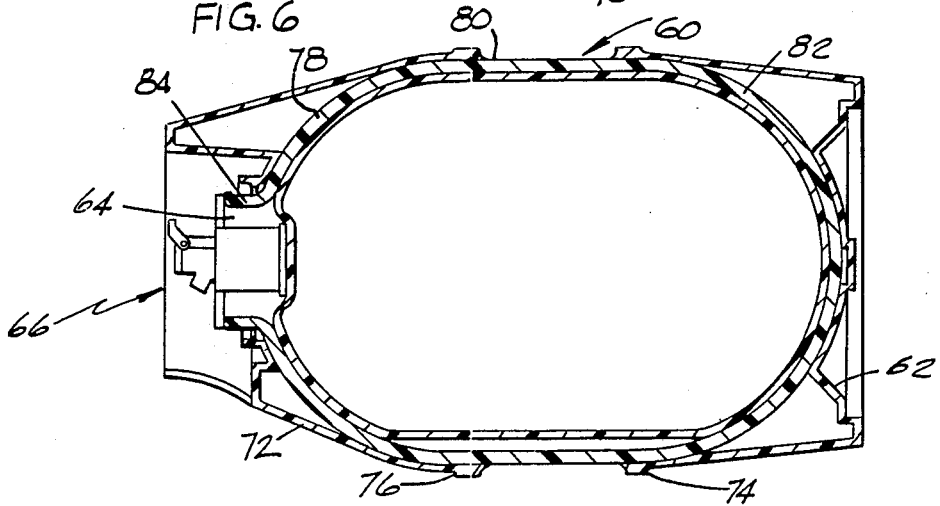

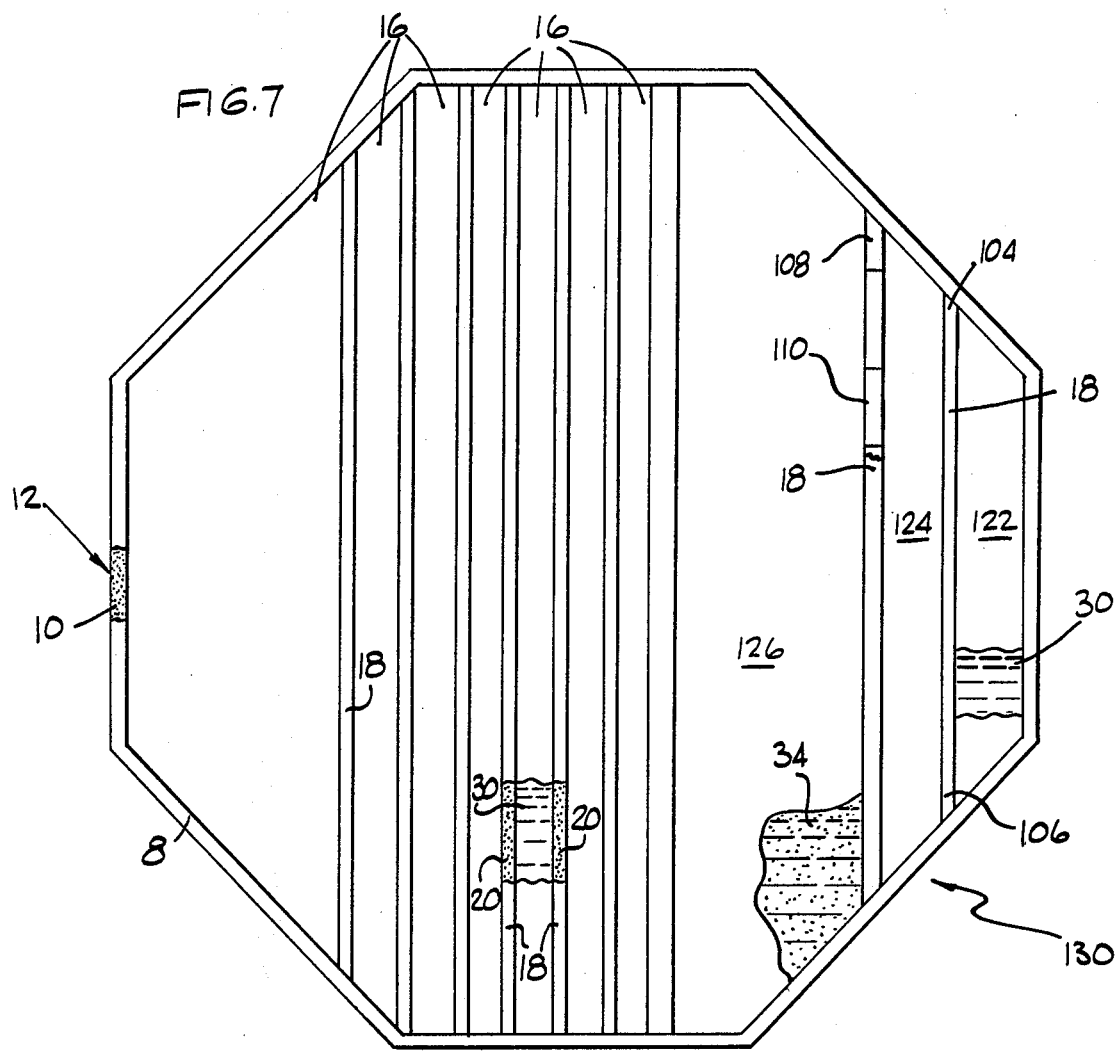

PRESSURE GENERATION SYSTEM FOR A CONTAINER

BACKGROUND OF THE INVENTION

This invention relates generally to a self-generating gas pressure apparatus such as an expandable pouch means positionable in a container containing a flowable material so as to provide pressure on the material so that it can be dispensed from the container, and in particular to a method for gas generation employing gas-producing chemical reactants wherein a precipitated reactant is provided in a water-dispersible suspension medium to thereby evenly disperse that reactant and enhance the maintenance of gas production and resultant pressure within the apparatus.

The use of self-generating gas pressure apparatus in general within a container from which a flowable material such as, but not limited to, a fluid is to be dispensed under pressure is well-known in the art. U.S. Pat. Nos. 4,360,131, 4,376,500, 4,478,044 and 4,513,884, for example, describe various gas-generating pressure apparatus. Typically, an expandable closed vessel such as a pouch means having a plurality of internal compartments is employed, with the compartments having interfacing barriers or individualized walls formed by seals which are rupturable under pressure. Within adjacent compartments, for example, one such compartment will contain a first chemical compound and the second compartment will contain a second chemical compound. The particular compounds are chosen from among those which react with each other to form a gas. Thus, for example, one compartment may contain citric acid, while the other compartment contains sodium bicarbonate. When these two compounds mix with each other, they react to produce carbon dioxide. To accomplish such mixing in the expandable vessel, a trigger reaction is permitted to occur which subsequently causes the rupture of the seal which interfaces between the two adjacent compartments. This results in the mixture and reaction of the two compounds to produce a gas which expands the vessel to thereby apply pressure on the material within the container in which the expandable vessel is housed. A novel self-generating pressure applying means is taught in co-pending and commonly-assigned U.S. Pat. application Ser. No. 034,900, filed Apr. 6, 1987, incorporated herein by reference.

While gas pressure generation occurs as above described and is generally adequate as long as sufficient time passes between individual dispensing procedures to thereby achieve pressure regeneration from continued chemical reaction, such generation may not be sufficiently uniform to provide optimum pressure to the material to be dispensed from the container during continued dispensing, resulting in an inconsistent or erratic flow from the container as the dispensing procedure continues. Commonly assigned U.S. Pat. No. 4,785,972, incorporated herein by reference, provides for the inclusion of a nucleating agent with the gas-producing chemical reactants to aid in uniform and rapid pressure maintenance. We now have found that by providing any such precipitated reactant in a water-dispersible suspension medium such as a gum or an algin to thereby achieve uniform suspension and dispersion thereof significantly improves pressure maintenance during the dispensing procedure. Further, by suspending precipitated and any insoluble components in the suspension, the initial filling of the expandable vessel with such suspension is much less cumbersome and is easily accomplished with automatic filling apparatus.

Accordingly, it is a primary object of the present invention to provide a self-generating gas pressure apparatus wherein gas formation occurs relatively rapidly and wherein gas pressure is relatively uniformly maintained during continued dispensing of flowable materials subjected to the gas pressure apparatus. Another object of the present invention is to provide apparatus wherein precipitated chemical compounds which react to produce gas are provided as suspensions. Yet another object of the present invention is to provide apparatus wherein resultant pressure provided by the apparatus can be pre-chosen through selected variations in quantities of reactant chemicals. These and other objects of the present invention will become apparent throughout the description thereof.

SUMMARY OF THE INVENTION

The subject of the present invention comprises a self-generating gas pressure apparatus, such as an expandable closed vessel as exemplified by a pouch means, for placement within a container from which a flowable material therein is to be dispensed under pressure. The apparatus comprises a plurality of internal, sealed, respectively adjacent compartments formed by respective interfacing seal means which are rupturable under pressure and contain respective chemical compounds which, when mixed upon the rupture of interfacing seal means, produce a gas. Within at least two adjacent internal compartments in a first embodiment are respectively housed a first water-soluble chemical compound in aqueous solution and a second precipitated chemical compound in a water-dispersible suspension medium as exemplified by, but not limited to, a gum, an algin or pectin which, when mixed together, produce a gas. In a second embodiment, an empty compartment is disposed between two compound-containing compartments and is in fluid communication with one of the compound-containing compartments. Two preferred reactants are citric acid (water-soluble) and sodium bicarbonate (precipitate) which produce carbon dioxide. A preferred suspension medium is a xanthan gum suspension. The suspension additionally can contain an insoluble nucleating agent physically characterized as large surface-area particles preferably having a plurality of sharp edges. Diatomaceous earth exemplifies such particles. A surfactant also can be included in the suspension. Upon rupture of the seal means between the two adjacent compartments in the first embodiment or the seal means between the empty compartment and the non-communicating compartment of the second embodiment, the first and second chemical compounds mix with each other to produce the gas which expands the apparatus and thereby applies pressure to the material within the container wherein the apparatus is housed so that this material can be dispensed under pressure. By providing the gas-producing precipitated chemical reactant dispersed in a suspension medium, both reactants interact with each other with great efficiency to thereby produce and maintain gas production, and resultant pressure, effectively during intermittent as well as continuous pressurized dispensing procedures.

BRIEF DESCRIPTION OF THE DRAWINGS

An illustrative and presently preferred embodiment of the invention is shown in the accompanying drawings in which:

FIG. 4 is a cross-sectional view, except for the dispensing means, illustrating a container means and its supporting structure in an upright position for shipping and commercial storage and a partially expanded expandable pouch means;

FIG. 5 is a view similar to FIG. 4 but with the container means in a dispensing position and after more than half of a fluid contained therein has been dispensed;

FIG. 6 is a view similar to FIG. 4 but after substantially all of the fluid has been dispensed.

FIG. 7 is a front elevation view of a second expandable pouch means and the components of a gas generating system.

DETAILED DESCRIPTION OF THE PREFERRED EMBODIMENT

Figure 1:
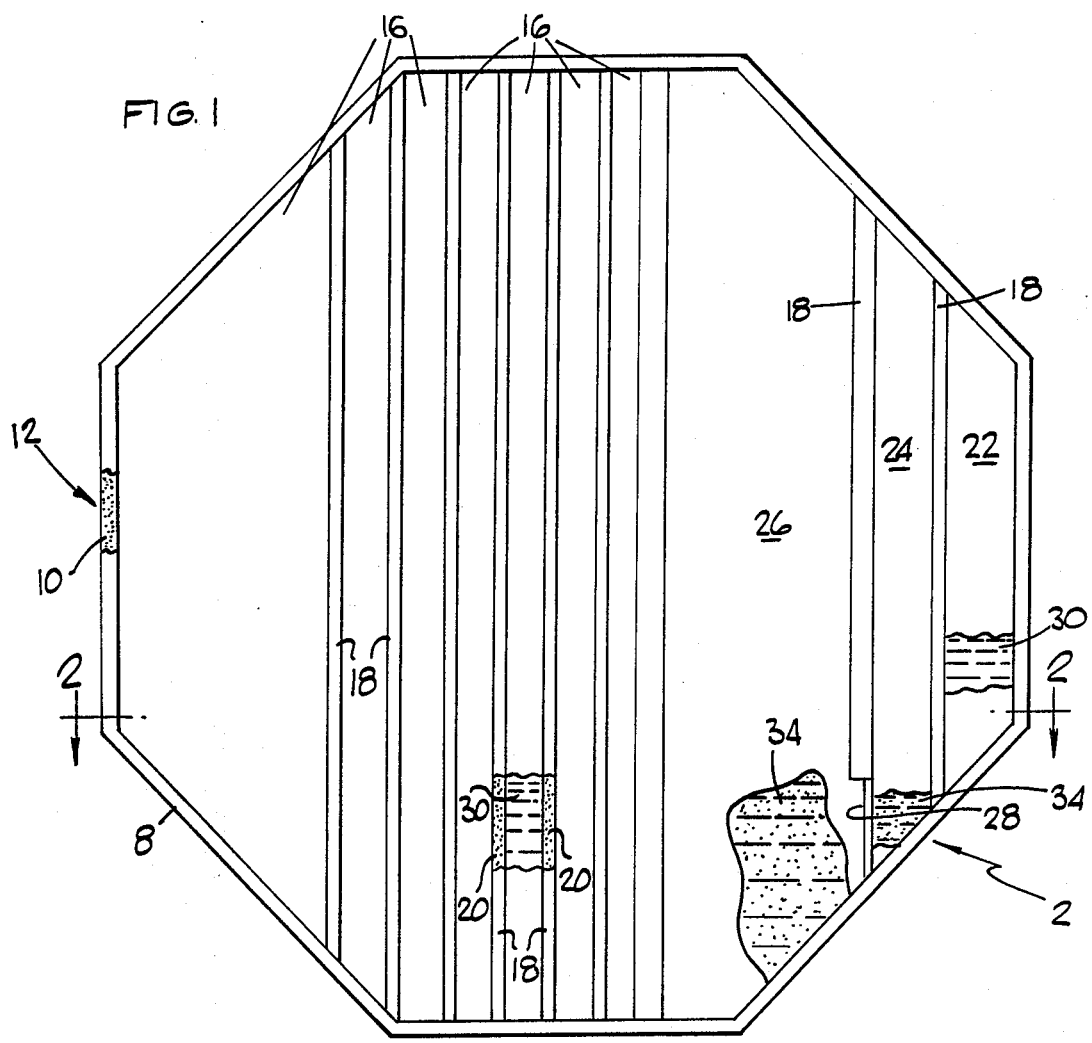
FIG. 1 is a front elevational view with portions broken away illustrating an expandable pouch means and the components of a gas generating system.
Figure 2:
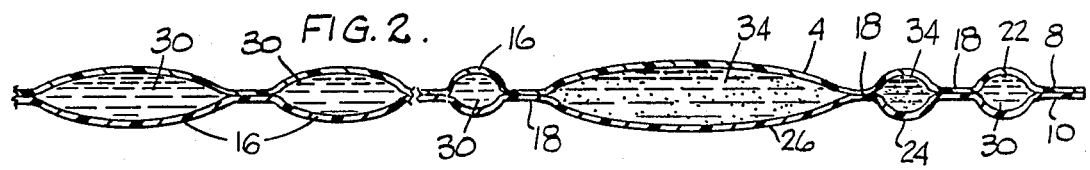
FIG. 2 is a cross-sectional view taken along a portion of the line 2—2 of FIG. 1.
Figure 3:
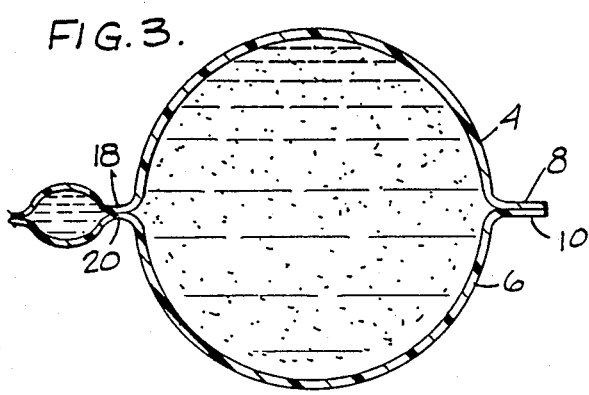
FIG. 3 is a cross-sectional view of a partially expanded expandable pouch means.

An expandable pouch means 2 of the presently preferred embodiment is illustrated in FIGS. 1-3 and comprises two relatively flat sheets 4 and 6 of a flexible plastic material in superposed relationship and made from a gas and liquid impermeable material such as a composite material of an outside layer of a polyester with an inside coating of PVDC, a primer adhesive, a layer of polyethylene and a co-extruded layer containing ethylene vinyl acetate, polyethylene, and an ionomer resin, such as that marketed by Dupont under the trade designation SURLYN. Each of the flat sheets 4 and 6 is generally octagonal in shape and with peripheral edge portions 8 and 10 permanently joined together by a permanent sealing means 12 formed by heat sealing at a temperature of about 290°-310° F. for about 0.5-3 seconds at a pressure of about 35 psi. The expandable pouch means 2 is formed into three adjacent compartments 22, 24, 26, and a plurality of other compartments 16 by a plurality of lengthwise extending strips 18 which join together opposed portions of the flat sheets 4 and 6 using a semipermanent pressure-rupturable sealing means 20 formed by heat sealing at a temperature of about 190°-200° F. for 0.5-3 seconds at a pressure of about 35 psi. If the flat sheets 4 and 6 are formed from different plastic materials, the temperature, time, and pressure would be adjusted as required to obtain the desired type of seal. Also, if desirable, a suitable adhesive could be used to obtain the desired results.

The normal operation of an expandable pouch means usually uses some delaying system so that the chemical reaction can be started and still allow for sufficient time for the pouch means to be inserted into the container means and suitable sealing and dispensing means applied to the container means. The delaying system for this invention is illustrated in FIG. 1 in the three adjacent compartments 22, 24, 26. The compartment 22 is formed by a lengthwise extending strip 18, as described above, extending parallel to the next adjacent permanent lengthwise extending sealed edge portions 8 and 10. The compartments 24 and 26 are formed by a lengthwise extending strip 18, as described above, extending parallel to and spaced inwardly from the strip 18 forming compartment 22. The lower portion 28 of the strip 18 forming the compartments 24 and 26 has a reduced width for a purpose described below. A quantity of a first water-soluble chemical compound in aqueous solution, here a 50% citric acid solution 30, is contained in the compartment 22. A water-dispersible gum suspension 34, here a xanthan gum suspension, containing the second compound, here precipitated sodium bicarbonate, is contained in the compartment 24. A gum suspension 34 containing sodium bicarbonate is likewise contained in the compartment 26. The other compartments 16 each contain a quantity of the citric acid solution 30. It is to be understood, of course, that other or additional chemical reactants can be employed as would be recognized by the skilled artisan to produce a desired gas end-product. It is also to be understood that other water-dispersible suspension media, such as an algin or pectin, for example, or combinations of such media, can be employed as the suspension medium for the precipitated chemical compound.

In operation, a force is applied to the compartment 22 prior to insertion of the pouch means 2 into the container means to rupture the strip 18 so that the citric acid solution 30 flows into compartment 24 to contact the sodium bicarbonate of the gum suspension 34, and begins to react therewith to generate carbon dioxide gas. This reaction with the sodium bicarbonate proceeds at a rate to provide the above-described delaying system to allow the expandable pouch means 2 to be inserted into the container means and suitable sealing and dispensing means applied to the container means. The generation of the carbon dioxide gas forms a pressurized force forcing the strip 18 between the compartment 24 and the compartment 26 to rupture at the weakened reduced width 28 to combine the compartments 24 and 26. This permits the citric acid solution 30 to flow into compartment 26 and into contact with the sodium bicarbonate in the gum suspension 34 and further react to continue the generation of carbon dioxide gas. As the generation of the carbon dioxide gas continues, the pressure within the first compartment 14 is increased so as to expand the portions of the flat sheets 4 and 6 forming the compartments 22, 24, 26. The dispensing of a flowable material such as a fluid from the container means, as described below, will provide space for further expansion of the expandable pouch means 2. When the limit of the volume of the first compartment 14 is reached, further generation of carbon dioxide gas therein will result in a force being applied to the strip 18 forming the next adjacent other compartment 16 so as to rupture such strip 18. The citric acid solution 30 in the next adjacent other compartment 16 will contact the sodium bicarbonate of the gum suspension 34 to continue the generation of carbon dioxide gas. This sequence will continue until the expandable pouch means 2 has been substantially completely expanded. The total amount of citric acid solution 30 in the entire pouch means 2 here exemplified is 81.1 ml. A preferred gum suspension 34 composition is described below in the Example. As would be recognized by the skilled artisan, reactant quantities are, of course, chosen according to the volume of the pouch means 2 as well as the magnitude of chemical reaction desired.

The location of the expandable pouch means 2 in a container means 60 is illustrated in FIGS. 4-6. In FIG. 4, the container means 60 is supported in the upright position for shipping and commercial storage by a support member 62. The expandable pouch means 2 has a length substantially greater than the longitudinal extent of the container means 60 and a width substantially greater than the diameter of the container means 60. Therefore, in order to insert the expandable pouch means 2 through an opening 64 in the container means 60, it is necessary to apply a force in a widthwise direction to compact the expandable pouch means 2 in that direction so that its cross-sectional configuration is less than the cross-sectional configuration of the opening 64. Also, as the expandable pouch means 2 is inserted into the container means 60, it is necessary to apply a force in the lengthwise direction to push the expandable pouch means 2 into the container means 60. This results in a crumpling of the expandable pouch means 2 in the lengthwise direction. Since the material in the expandable pouch means 2 has little tendency to resile, it will remain crumpled while a dispensing means 66 for dispensing portions of the material in the container means 60 is assembled in the opening 64. In the preferred embodiment, the flowable material 68, such as a carbonated beverage such as beer, is in the container means 60 prior to the insertion of the expandable pouch means 2. If desired, the expandable pouch means 2 can be inserted into the container means 60 prior to the filling of it with the fluid. The fluid level 70 is slightly below the dispensing means 66. The strip 18 forming compartment 22 is ruptured prior to the insertion of the expandable pouch means 2 into the container means 60 so that the gas generating system is in operation, as described above, and partial expansion has occurred as illustrated in FIG. 4. The container means 60 is illustrated in the dispensing position in FIGS. 5 and 6. Another support member 72 has been previously secured to the container means 60. The support member 62 and the support member 72 have planar surfaces 74 and 76 for supporting the container means 60 on a generally horizontal surface, such as a shelf of a home refrigerator. The planar surfaces 74 and 76 also function to maintain the container means 60 in such dispensing position. While it is highly preferred to use the horizontal dispensing position, it is understood that the pressure in the container means provided by the expandable pouch means would permit dispensing in other positions, some of which may require different types of dispensing means. In FIG. 5, more than half of the material 68 has been dispensed from the container means 60. The initial three adjacent compartments 22, 24, 26 and several of the next adjacent other compartments 16 have been expanded, as described above, to form a combined compartment which is located adjacent to the upper longitudinally extending portion of the container means 60. In FIG. 6, the expandable pouch means 2 is substantially fully expanded and is substantially completely in contact with the inner surface of the container means 60 except for the portion defining the opening 64. After substantially all the material 68 has been dispensed from the container means 60, a pressure relieving device (not shown) in the dispensing means 66 is actuated and the carbon dioxide gas in the expanded pouch means 2 is removed through the dispensing means 66 so that the container means 60 and the expandable pouch means 2 are substantially at atmospheric pressure and the container means 60 can be safely placed in the trash.

When the expandable pouch means 2 is being inserted into the container means 60, the strips 18 are generally parallel with the longitudinal axis of container means 60 to thereby achieve optimum positioning for material dispensing under pressure. As explained above, the relative length of the expandable pouch means 2 causes it to be crumpled as it is inserted into the container means 60. However, the strips 18 still extend generally in the same direction as the longitudinal axis of the container means 60. As material is dispensed from the container means 60 and more of the other compartments 16 are expanded, the expanded portion of the expandable pouch means 2 gradually moves into a position wherein its longitudinal axis is parallel to the longitudinal axis of the container means 60, as illustrated in FIG. 6. When the expandable pouch means 2 is fully expanded, as illustrated in FIG. 6, the longitudinal axes of the expandable pouch means 2 and the container means 60 will substantially coincide.

As illustrated in FIGS. 4-6, the container means 60 comprises a blown hollow integral plastic container means made of one piece of integrally molded plastic material, such as polyethylene terephthalate (PET), and having a hemispherical top portion 78, an annular cylindrical central portion 80, a hemispherical bottom portion 82 and a neck portion 84 defining the opening 64. The container means 60 here shown is large enough to hold 288 fluid ounces of a beverage, and has an actual capacity of 10.2 liters.

The expandable pouch means 2 may be of any size and shape so as to be commensurate with the size and shape of the container means 60 with which it is to be used. Also, the expandable pouch means 2 may be used to dispense any kind of material from the container means as is customary in this art. However, in the preferred embodiment of the invention, the expandable pouch means 2 is designed for applying pressure to a quantity of beer equal to 288 fluid ounces or 2.25 gallons in a container means 60. The expandable pouch means 2 exemplified is designed for such a container means wherein the container means 60 has an overall length along its longitudinal axis of about 15.5 inches, an external diameter of the cylindrical central portion 70 of about 9.0 inches, and an average wall thickness of about 0.030 inches. The expandable pouch means 2 has an overall length of about 18 inches and an overall width of about 18 inches and has 10 compartments formed therein. As is apparent, and dependent upon its application, the pouch means may have as few as two compartments, with each respectively containing one of the two required chemical compounds which subsequently react with each other upon rupture of the strip 18 between the two compartments.

FIG. 7 illustrates a third preferred embodiment of a pouch means 130 for applying pressure on flowable material in a container. Many of the components of the pouch means 130 and the pouch means 2 are identical, and are identified with identical reference numerals with no further description thereof. As the pouch means 130 is inserted into a container 60 such as that shown in FIG. 4, the lengthwise extending strips 18 have top ends, indicated generally by the reference numeral 104, and bottom ends, indicated generally by the reference numeral 106. The strip 18 between the third compartment 126 and the second compartment 124 has a first opening 108 therethrough formed adjacent its juncture with the peripheral edge portions 8 and 10. Additionally, a second opening 110 therethrough can be located a short distance below the first opening 108 and each of the openings 108, 110 provide a fluid communication between the third compartment 126 and the second compartment 124. A 50% citric acid solution 30 is contained in the first compartment 122, while a water-dispersible gum suspension 34 containing precipitated sodium bicarbonate is contained in the third compartment 126. The second compartment 124 contains neither component, while the remaining compartments 16 each contain a quantity of the citric acid solution 30.

In operation, the pouch means 130 is held in a vertical position so that the citric acid solution 30 in the first compartment 122 is located in the lower portion thereof. While the pouch means 130 is maintained in a vertical position, the strip 18 between the first and second compartments 122 and 124, respectively, is mechanically ruptured to permit the citric acid solution 30 to flow into the bottom of the second compartment 124. The pouch means 130 is maintained in a vertical position and inserted into a container 60 as shown in FIG. 4. After the dispensing means 66 is inserted into the opening 64 of the container 60 and secured therein, the container 60 is inverted to simultaneously invert the pouch means 130. This inversion permits a mixture of the citric acid solution 30 and the gum suspension 34 as each flows through the openings 108, 110 to meet in the second compartment 124. This resultant mixture causes the formation of carbon dioxide gas whose pressure completely ruptures the strip 18 between the second and third compartments 124 and 126, respectively. The container 60 then is returned to an upright position for shipping or storage. As is apparent, and dependent upon its application, the pouch means may have as few as three compartments.

EXAMPLE

As stated earlier, the citric acid component of the described preferred pressure generation system is a 50% aqueous solution. This concentration of citric acid is completely soluble in water and remains in solution. The entire amount of citric acid solution in the described pouch is 81.1 ml.

While sodium bicarbonate is a water-soluble compound, the quantity required to react with all citric acid present in the pouch and thereby completely expand the pouch in the present system in relation to the amount of water present results in sodium bicarbonate precipitate which will not readily remain in suspension in an aqueous medium. Instead, the sodium bicarbonate settles and does not present an adequate surface area for sufficient reaction with citric acid to produce the required amount of carbon dioxide gas in the time frame in which it must be produced. To achieve adequate dispersion of the sodium bicarbonate for proper reactivity with citric acid, the sodium bicarbonate is contained in a water-dispersible gum suspension which can include therewith a nucleating agent, such as diatomaceous earth, and a surfactant. In the preferred embodiment, a xanthan gum suspension is employed as a suspension medium, and the components comprising the gum suspension, per pouch, are as follows:

| Component | Actual Amount | Weight % |
| --- | --- | --- |
| Sodium bicarbonate | 100 g | 37.46 |
| Water | 150 ml | 56.19 |
| Diatomaceous earth | 10 g | 3.75 |
| Surfactant | 5 ml | 2.17 |
| Xanthan gum | 1.125 g | 0.42 |

The surfactant here employed is identified as "Dowfax 2A1," manufactured by Dow Chemical Company, and the xanthan gum is identified as "Keltrol T," manufactured by Kelco Company. The diatomaceous earth is manufactured by Manville Corporation under the name "Celite 512."

To prepare the gum suspension, all of the initially dry components (gum, sodium bicarbonate, diatomaceous earth) are mixed with each other. After mixing the liquid components (water, surfactant) together, the mixture of dry components is added to the liquid with agitation until mixing is complete. It has been found that more than about 2 wt. % of gum in relation to water quantity in the exemplified embodiment results in a generally unworkable mixture because of excessive viscosity, with an effective range of xanthan gum quantity per water quantity being from about 0.25 wt. % to about 2 wt. %. While xanthan gum is here illustrated, it is to be understood that other water-dispersible gums, including, but not limited to, polysaccharide gums, guar gum and carboxymethyl cellulose, can be employed in place of the xanthan gum. Algins, such as sodium alginate, for example, or pectin can be used in place of gum, and mixture of gums and/or algins and/or pectin also have utility. Any suspension-medium quantity can be used so long as workability thereof, because of excessive viscosity, is not impeded. The nucleating agent (diatomaceous earth) and/or surfactant can be deleted from the gum suspension without eliminating utility of the invention. The nucleating agent can be chosen from any such agent which has large surface area and pointed edges, while the surfactant can be any appropriate synthetic detergent or dispersing agent as would be recognized by the skilled artisan. It is preferred that all components be acceptable for direct food contact or are food grade if the flowable material to be dispensed from the container in which the pouch means is placed is to be consumed by humans or animals. This precaution is taken in the event the pouch means accidentally ruptures and the contents therein become mixed with the contents to be dispensed and consumed.

Figure 8:
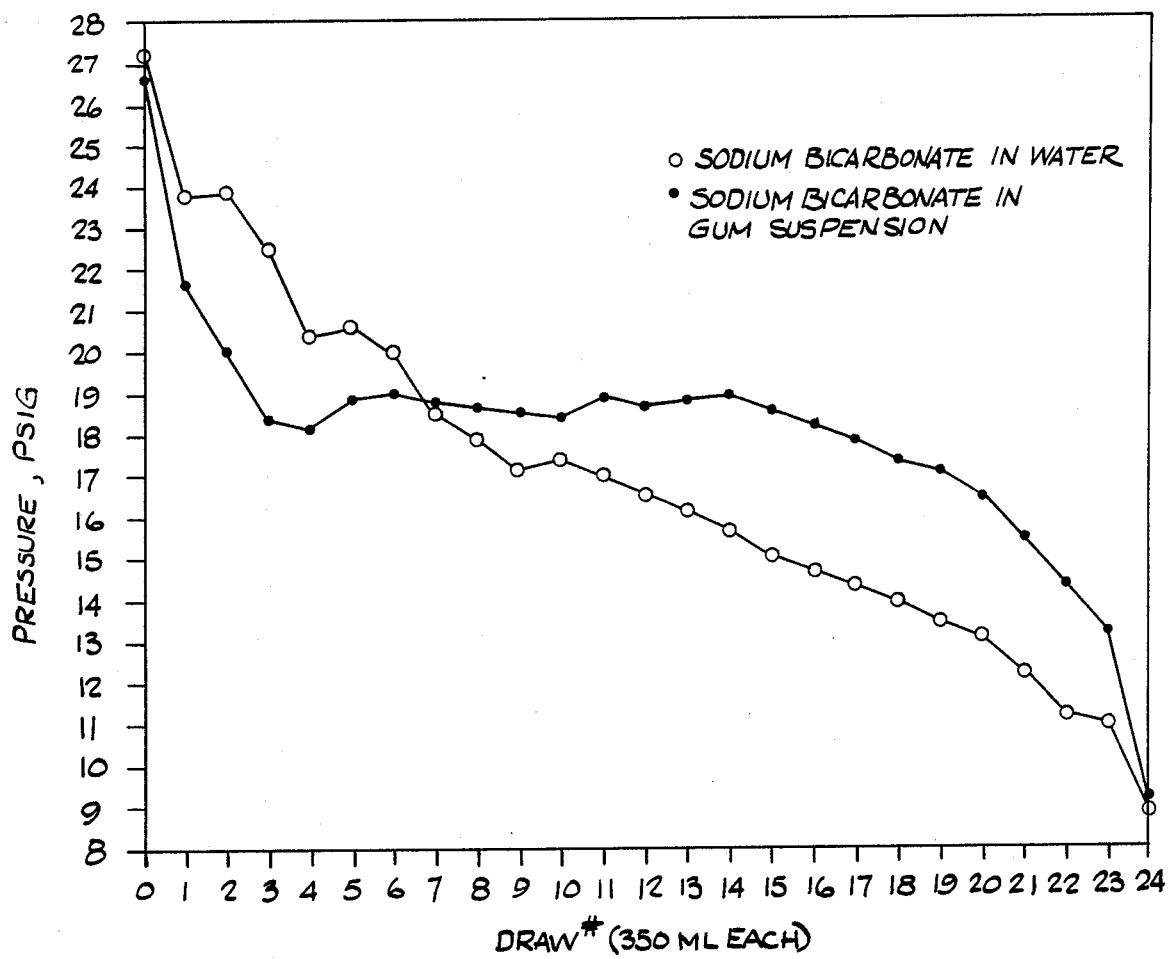
FIG. 8 is a graph contrasting pressure maintenance efficiency with and without a gum dispersion of a chemical compound reactant.

FIG. 8 graphically displays the pressures present within the container 60 from comparison tests between sodium bicarbonate in a xanthan gum suspension prepared in accord with the present example and sodium bicarbonate with a nucleating agent in water. All other conditions were identical, and liquid from within the container 60 was dispensed at 90-second intervals in 350 ml units. As is evident from these results, the pressure produced by incorporating sodium bicarbonate in a gum suspension maintained a more uniform and higher pressure generation beginning at about the seventh draw and continuing for the duration of the time span exemplified.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A self-generating gas pressure apparatus for placement within a container from which a flowable material in the container is to be dispensed under pressure exerted on the material by the gas pressure apparatus and wherein said gas pressure apparatus comprises a closed expandable vessel having a plurality of individual compartments formed by respective pressure-rupturable seal means therebetween, said compartments containing respective chemical compounds which when mixed upon the rupture of respective interfacing seal means produce a gas, and wherein at least two adjacent compartments respectively contain a first water-soluble chemical compound in aqueous solution and a second precipitated chemical compound dispersed in a water-dispersible suspension medium which, when said compounds are mixed upon the rupture of the seal means between said adjacent compartments, react with each other to produce a gas.

2. The invention according to claim 1 wherein the water-dispersible suspension medium is chosen from the group consisting of gums, algins, pectin, and mixtures thereof.

3. The invention according to claim 2 wherein the first chemical compound is citric acid and the second chemical compound is sodium bicarbonate.

4. The invention according to claim 3 wherein a nucleating agent is included in the suspension medium.

5. The invention according to claim 4 wherein the nucleating agent comprises diatomaceous earth.

6. The invention according to claim 4 wherein a surfactant is included in the suspension medium.

7. The invention according to claim 3 wherein a surfactant is included in the suspension medium.

8. The invention according to claim 2 wherein the suspension medium is xanthan gum.

9. The invention according to claim 2 wherein the suspension medium is a polysaccharide gum.

10. The invention according to claim 2 wherein the suspension medium is guar gum.

11. The invention according to claim 2 wherein the suspension medium is carboxymethyl cellulose.

12. The invention according to claim 2 wherein the suspension medium is sodium alginate.

13. The invention according to claim 3 wherein the suspension medium is xanthan gum.

14. The invention according to claim 3 wherein the suspension medium is a polysaccharide gum.

15. The invention according to claim 3 wherein the suspension medium is guar gum.

16. The invention according to claim 3 wherein the suspension medium is carboxymethyl cellulose.

17. The invention according to claim 3 wherein the suspension medium is sodium alginate.

18. A self-generating gas pressure apparatus for placement within a container from which a flowable material in the container is to be dispensed under pressure exerted on the material by the gas pressure apparatus, said gas pressure apparatus comprising:
  (a) a closed expandable vessel having at least three parallel individual compartments running essentially the entire length of the vessel and formed by respective pressure-rupturable seal means therebetween;
  (b) a first compartment containing therein a first water-soluble chemical compound in aqueous solution, a second, empty compartment immediately adjacent the first compartment, and a third compartment immediately adjacent the second compartment and containing a second precipitated chemical compound dispersed in a water-soluble suspension medium, said first and second chemical compounds being such that when mixed with each other they react to produce a gas;
  (c) at least one opening in the pressure-rupturable seal means between the second compartment and third compartment, said opening being situation near one end of the seal means to thereby provide communication between the second and third compartments and wherethrough a quantity of the water-soluble suspension medium containing the second chemical compound can be made to gravitationally flow into the second compartment to subsequently react with the first chemical compound from the first compartment upon rupture of the seal means between the first and second compartments; and
  (d) a quantity of the first water-soluble chemical compound in aqueous solution in all of the remaining individual compartments, with the proviso that the quantity of the second chemical compound initially in the third compartment be sufficient to react with essentially all of the first chemical compound present in the entire expandable vessel.

19. The invention according to claim 18 wherein the water-soluble suspension medium is chosen from the group consisting of gums, algins, pectin, and mixtures thereof.

20. The invention according to claim 19 wherein the first chemical compound is citric acid and the second chemical compound is sodium bicarbonate.

21. The invention according to claim 20 wherein a nucleating agent is included in the suspension medium.

22. The invention according to claim 21 wherein the nucleating agent comprises diatomaceous earth.

23. The invention according to claim 21 wherein a surfactant is included in the suspension medium.

24. The invention according to claim 20 wherein a surfactant is included in the suspension medium.

25. The invention according to claim 19 wherein the suspension medium is xanthan gum.

26. The invention according to claim 19 wherein the suspension medium is a polysaccharide gum.

27. The invention according to claim 19 wherein the suspension medium is guar gum.

28. The invention according to claim 19 wherein the suspension medium is carboxymethyl cellulose.

29. The invention according to claim 19 wherein the suspension medium is sodium alginate.

30. The invention according to claim 20 wherein the suspension medium is xanthan gum.

31. The invention according to claim 20 wherein the suspension medium is a polysaccharide gum.

32. The invention according to claim 20 wherein the suspension medium is guar gum.

33. The invention according to claim 20 wherein the suspension medium is carboxymethyl cellulose.

34. The invention according to claim 20 wherein the suspension medium is sodium alginate.

35. A method for producing gas in a self-generating gas pressure apparatus for placement within a container from which a fluid in the container is to be dispensed under pressure exerted by the apparatus, wherein the apparatus comprises a closed expandable vessel having a plurality of individual compartments formed by pressure-rupturable seal means therebetween, the method comprising:

(a) placing a first water-soluble chemical compound in aqueous solution in a first compartment, and placing a second precipitated chemical compound dispersed in a water-soluble suspension medium in a second compartment, with said first and second chemical compounds reactable with each other when mixed to produce a gas; and (b) causing the rupture of the seal means between the first and second compartments to thereby mix the first and second chemical compounds and produce gas.

36. The invention according to claim 35 wherein the water-dispersible suspension medium is chosen from the group consisting of gums, algins, pectin, and mixtures thereof.

37. The invention according to claim 36 wherein the first chemical compound is citric acid and the second chemical compound is sodium bicarbonate.

38. The invention according to claim 37 wherein a nucleating agent is included in the suspension medium.

39. The invention according to claim 38 wherein the nucleating agent comprises diatomaceous earth.

40. The invention according to claim 38 wherein a surfactant is included in the suspension medium.

41. The invention according to claim 37 wherein a surfactant is included in the suspension medium.

42. The invention according to claim 36 wherein the suspension medium is xanthan gum.

43. The invention according to claim 36 wherein the suspension medium is a polysaccharide gum.

44. The invention according to claim 36 wherein the suspension medium is guar gum.

45. The invention according to claim 36 wherein the suspension medium is carboxymethyl cellulose.

46. The invention according to claim 36 wherein the suspension medium is sodium alginate.

47. The invention according to claim 37 wherein the suspension medium is xanthan gum.

48. The invention according to claim 37 wherein the suspension medium is a polysaccharide gum.

49. The invention according to claim 37 wherein the suspension medium is guar gum.

50. The invention according to claim 37 wherein the suspension medium is carboxymethyl cellulose.

51. The invention according to claim 37 wherein the suspension medium is sodium alginate.

* * * * *